United States Patent [19]
Aker et al.

[11] 3,936,824
[45] Feb. 3, 1976

[54] METHOD AND APPARATUS FOR DIGITALLY MEASURING SPEED

[75] Inventors: John L. Aker; Donald L. Geist, both of Chanute; Freddie R. Kittle, Savonburg; Fred M. Berry, Leawood, all of Kans.

[73] Assignee: Kustom Electronics, Inc., Chanute, Kans.

[22] Filed: May 18, 1973

[21] Appl. No.: 361,822

[52] U.S. Cl. ..................................... 343/8; 343/7.7
[51] Int. Cl.² ............................................ G01S 9/46
[58] Field of Search ................... 343/8, 5 DP, 9, 7.7

[56] References Cited
UNITED STATES PATENTS

| | | | |
|---|---|---|---|
| 3,118,139 | 1/1964 | Durstewitz | 343/8 |
| 3,241,138 | 3/1966 | Zadig | 343/8 |
| 3,438,031 | 4/1969 | Fathauer | 343/8 |
| 3,517,998 | 6/1970 | Pryor | 343/8 |
| 3,689,921 | 9/1962 | Berry | 343/8 |

*Primary Examiner*—T. H. Tubbesing
*Assistant Examiner*—G. E. Montone
*Attorney, Agent, or Firm*—Lowe, Kokjer, Kircher

[57] ABSTRACT

A digital display doppler radar unit has a moving mode and a stationary mode. The incoming doppler signal, which in the moving mode, represents both speed of the radar platform and speed of an approaching target vehicle, is separated into two signal components by selective filtering. One component represents the sum of the ground speeds for the radar platform and approaching vehicles. A time base is generated by a crystal control means and the time base is utilized for correlating the received doppler signals, indicative of speed, with the time base. Each doppler signal component is converted to binary coded decimal (BCD) information and a digital counter counts the cycles of each reeived doppler signal and compares the count with an amount previously stored. Circuit means are provided to validate the received doppler signal, allowing their continual processing only after a preselected number of valid comparisons are made. The radar signal component representing the ground speed sum for the radar platform and the approaching target vehicle, and the component representing radar platform speed are combined. The radar platform speed is subtracted from the combined component, resulting in a digital count representing approaching target vehicle speed. In the stationary mode, there is no radar platform doppler pulses in the radar return and consequently, the returning pulses may be processed directly and no subtracting function is performed. Speeds corresponding to the valid received doppler signals are suitably displayed to indicate a speeding violation.

20 Claims, 5 Drawing Figures

METHOD AND APPARATUS FOR DIGITALLY MEASURING SPEED

BACKGROUND AND BRIEF DESCRIPTION OF THE INVENTION

The use of doppler radar techniques for measuring the speed of moving objects and more particularly for measuring the speed of motor vehicles is well known in the art. By their nature, doppler return signals are often very inaccurate. This is due to the large noise level that would include white noise, reflection difficulties due to multiple targets and/or the dropping of pulses at critical intervals so that incorrect and erroneous displays are prevalent in many prior art devices. A general solution to these prior art difficulties is given and described in the U.S. Patent to Berry, No. 3,689,921, issued Sept. 5, 1972, which is incorporated by reference herein.

It has become apparent that the efficiency of selective electronic speed limit law enforcement can be increased if the radar platform, conventionally a police patrol car, is capable of movement during such enforcement and surveillance. A number of devices also are known in the art which attempt to impart movement capabilities to the radar platform. While these devices work well for their intended purposes, they often are inaccurate or are dependent, in generating a speed solution, on factors other than the mere reflected return of a generated frequency. When the radar platform is moving, at least two doppler return signals are produced simultaneously and these signals create a complex wave form for the radar receiver input. One larger doppler signal component will be generated by the reflected waves from the road and the other stationary objects, with its frequency representing the speed of the radar platform. A second doppler signal component is generated by the waves reflected from an approaching vehicle, and since the relative speed between the approaching vehicle and the patrol car is the sum of their two ground speeds, this doppler signal component frequency will represent the sum of two ground speeds. It should be noted that the second doppler signal component's frequency always will be higher than the first if the patrol car and the moving vehicle are traveling in opposite directions. The radar unit of this invention isolates these two doppler signal components by selective filtering. Alternatively, two separate antenna systems could be used thereby with one antenna directed to the surface while the second system is directed to the oncoming target vehicle. The unit counts the two frequencies digitally, subtracts the speed of the radar platform from the doppler count of the approaching vehicle, and automatically converts the resultant digital count into mile per hour units. The result is the true ground speed of the approaching vehicle.

In the stationary mode of operation, only one predominant doppler signal is returned, which represents the speed of the approaching vehicle. The filtering process is bypassed and the doppler signal frequency is counted directly. The subtraction process is not executed since the radar platform speed is zero and the counted doppler frequency represents the speed of the approaching vehicle.

If a plurality of valid comparisons are indicated over a preselected number of counting cycles, the speed indicated by the totalized number of pulses is presumed valid and is accordingly digitally displayed or utilized to give either a visual or audible warning, thereby indicating a speed violation. If a non-concidence counter is activated, the count previously stored for possible display purposes is discarded and the counting and count comparison scheme must be recycled. In this manner, all false signals including noise and reflections are disregarded and only valid speed indications are chosen for display.

A primary objective of this invention is to provide a unique method and apparatus for use in law enforcement and vehicle speed surveillance systems that measure the speed of an approaching vehicle when the radar platform is moving.

Another object of this invention is to provide a radar unit of the character described that provides accurate speed measurement and a direct reading of the absolute speed of a target vehicle when the radar platform is moving.

A further object of this invention is to provide a unique doppler radar unit that validates the accuracy of a received doppler signal prior to indicating the count value of the same as a correlation to vehicle speed.

A further object of this invention is to provide a radar unit having a comparing circuit means which will activate an audible alarm if the indicated vehicle speed equals or exceeds a preset violation speed limit selectively programmed by the radar operator.

Yet another object of this invention is to provide a doppler radar unit that efficaciously generates a speed solution directly from reflected waves when both the radar platform and target vehicles are moving.

Another object of the invention is to provide a unique radar unit that produces a digital speed readout when both the radar platform and the target vehicles are moving and to obviate the need for any mechanical linkage with the vehicle acting as the radar platform. In this manner no connection with the host vehicle odometer is needed.

A further object is to provide a moving vehicle radar system of the character described that requires but one antenna system.

Another object of the invention is to provide a unique circuitry in a moving radar of the character described that utilizes a single time base with at least two received doppler signal components. In this manner, the need for two or more time bases is therefore obviated.

A still further object of the invention is to provide a unique circuit for use with a moving radar which includes a means for ignoring the speed of an in-range oncoming vehicle under preselected conditions.

Other and further objects of this invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views.

Figure 1:
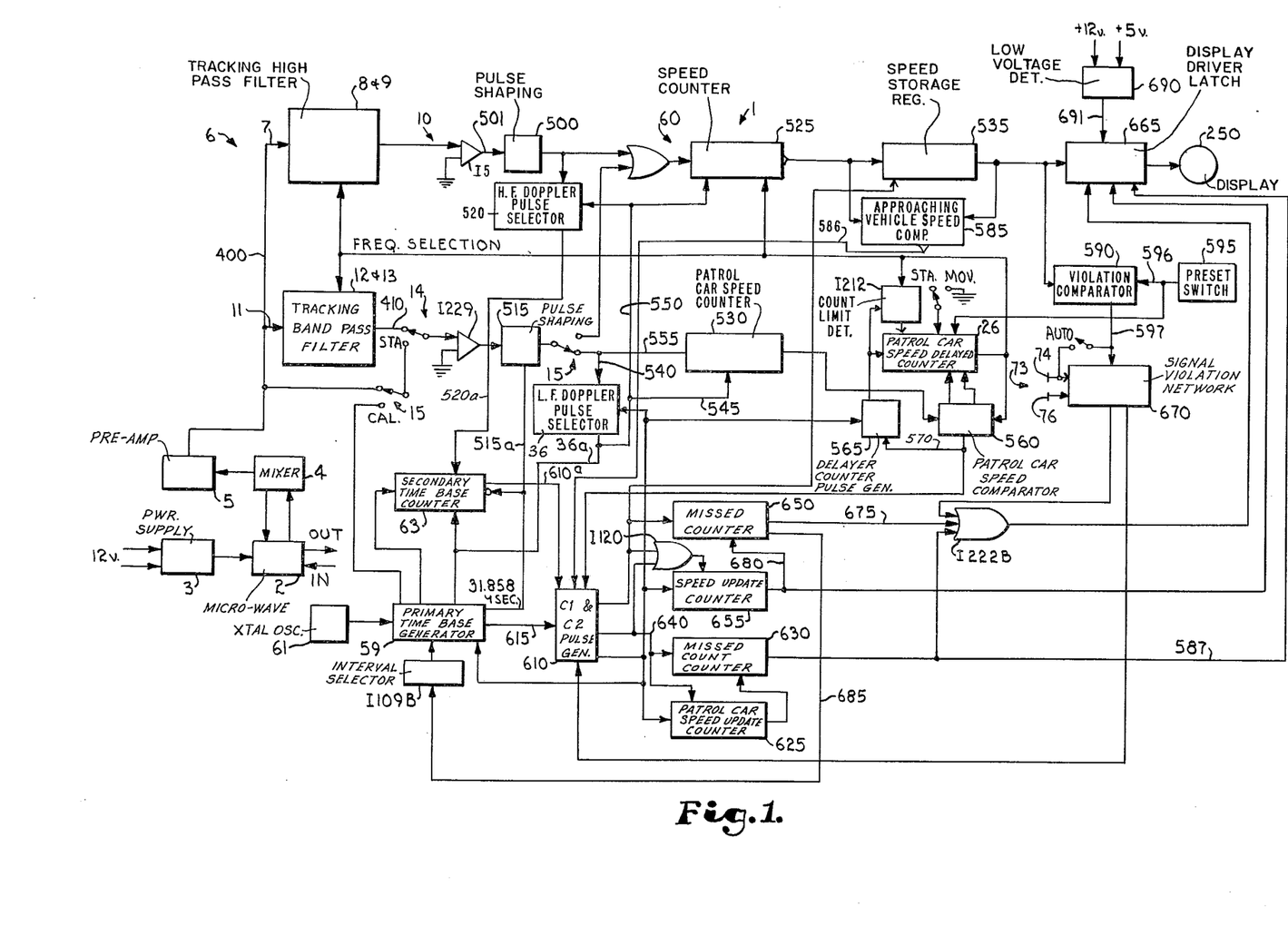
FIG. 1 is a block diagram of a radar unit for digitally determining the speed of a moving object when the radar platform is in motion.
Figure 2:
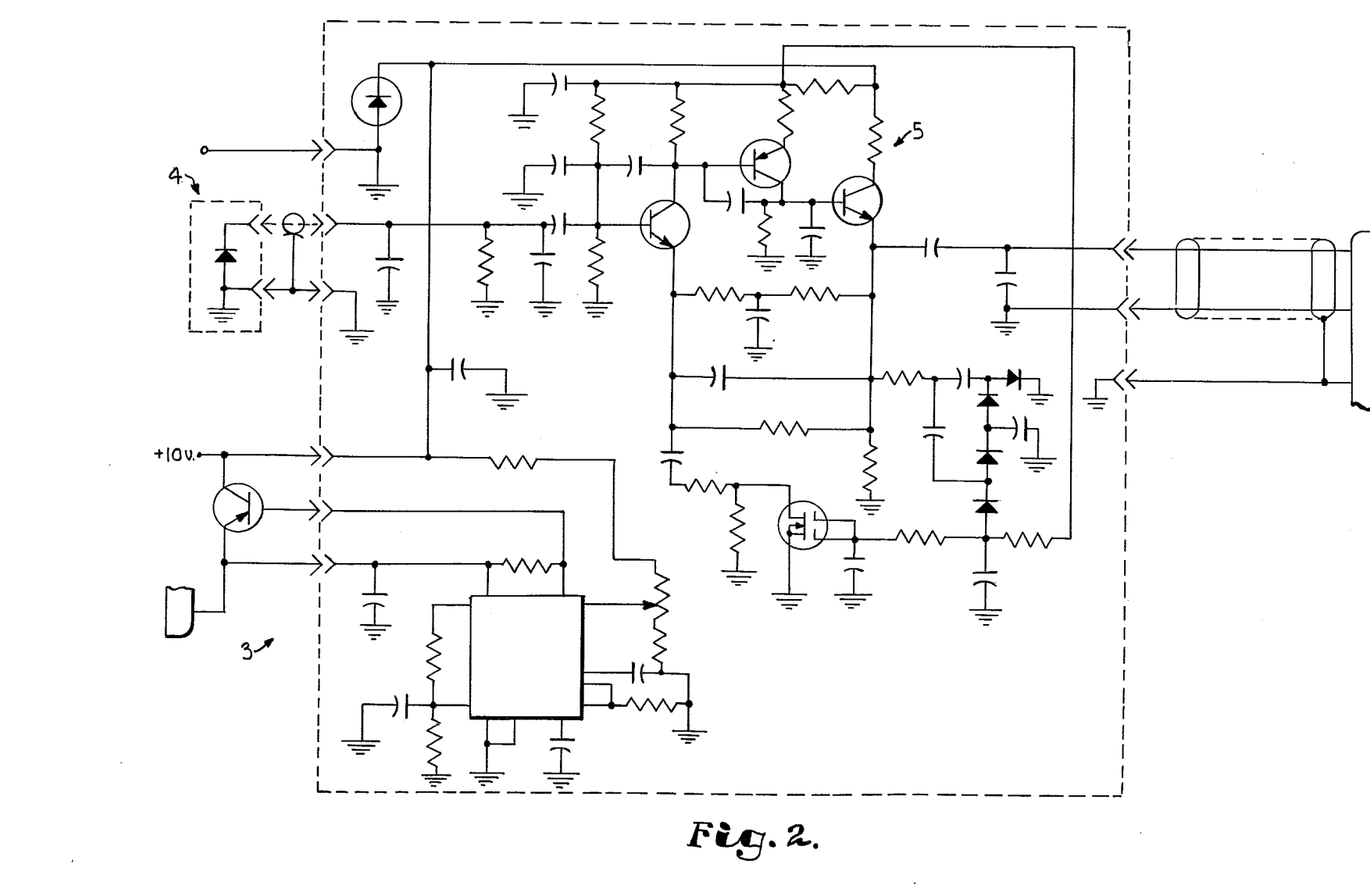
FIG. 2 is a detailed schematic diagram for the preamplifier and power supply shown in FIG. 1.

Turning now more particularly to the drawings, reference numeral 1 indicates the radar unit of this invention. The unit 1 includes a microwave circuit 2 electrically connected to an antenna (not shown). The microwave circuit 2 functions to generate and transmit a stable microwave signal and to receive the reflected signal and mix it with a sample portion of the transmitted wave. It then detects the difference in frequency between the transmitted and reflected wave, thereby determining the doppler shift. Conventionally, the microwave source is a Gunn effect diode mounted in a temperature compensated, tuned cavity which radiates a continuous 10.525 GHz lineraly polarized signal. The microwave circuit 2 is powered from a regulated power supply 3 which provides a 10 volt supply to the unit 1, and in particular, to the microwave circuit 2. Input to the power supply 3 may be from the radar platform (or patrol car) electrical system.

Figure 3:
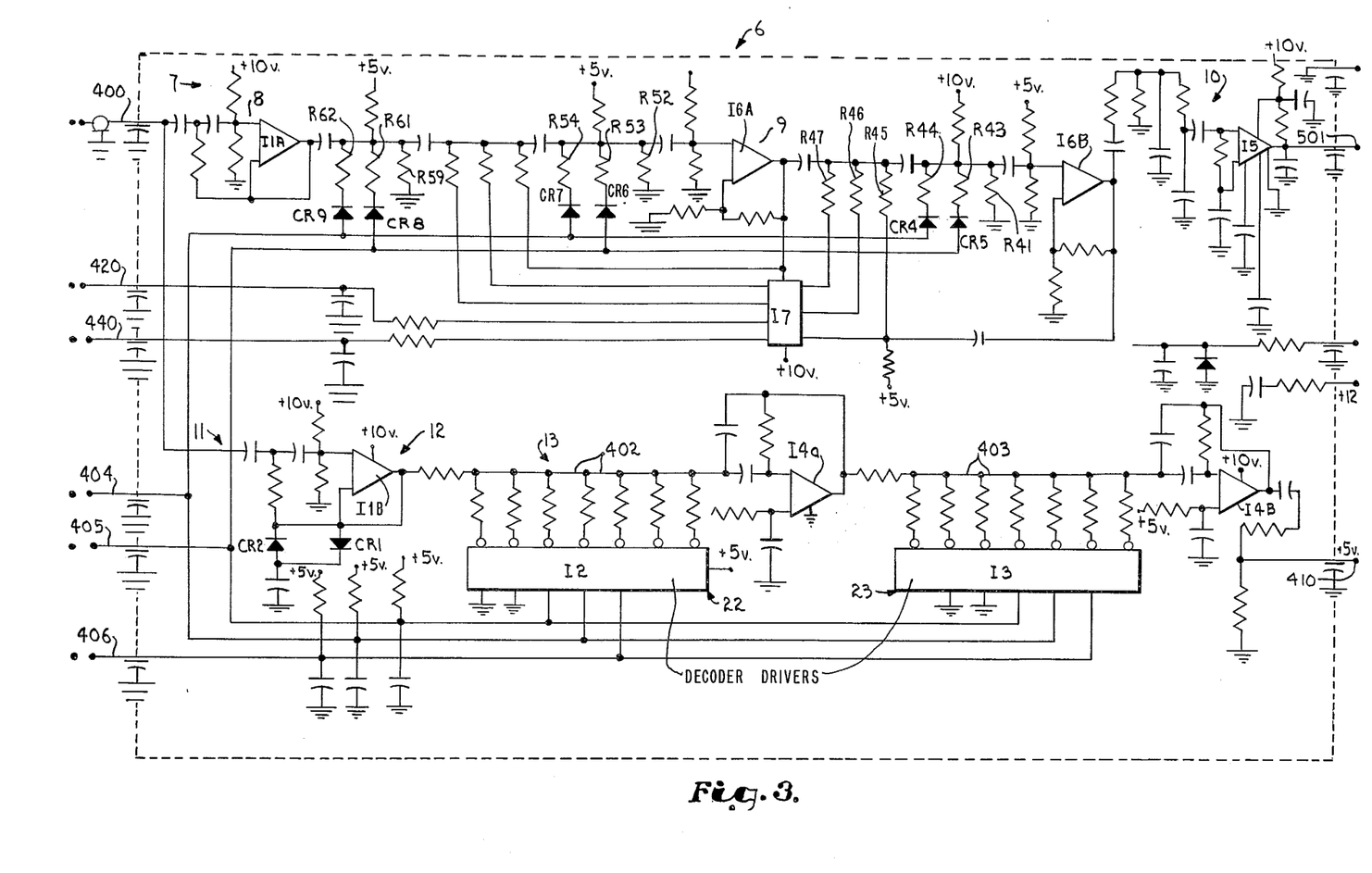
FIG. 3 is a detailed schematic diagram for the filtering channels for the radar unit of FIG. 1.

A mixer assembly 4 receives the input signal from the microwave circuit and detects the frequency difference between a sample transmitted signal and the reflected signals. The detected signal in turn is fed to a preamplifier 5 which amplifies the input signal and transmits it to the remaining circuitry of the unit 1. As indicated above, a signal from the amplifier (5) is a complex wave, formed by the algebraic sum of the radar platform speed and the speed of an approaching vehicle. In order to accurately count these two frequencies, the signals must be separated. This is accomplished in the unit 1 by use of filter means which includes a fixed high pass filter, a tracking high pass filter and a high doppler limiter in a channel designated by the numeral 7 and a fixed high pass and tracking band pass filter in a channel designated by the numeral 11 (FIGS. 1 and 3).

As suggested, the above filter means is a two channel device having an input 400 from the preamplifier 5. A first channel 7 (FIG. 1) receives the doppler signal input and feeds it through a fixed high pass filter 8, a tracking high pass filter 9 and a high doppler limiter 10. A second channel 11 receives the doppler signal input and feeds it through a fixed high pass filter 12, a tracking band pass filter 13, and a low doppler limiter 14. The low doppler limiter 14 is electrically connected to the filter means 6 through a switch assembly 15.

Filter 12 includes an amplifier I1B (FIG. 3) and is used to reject all frequencies representing radar platform speeds below 10 miles per hour, corresponding to a frequency of 31.4 Hz. A diode CR1 and a diode CR2 are connected across the output of the amplifier I1B and are used to limit the AC component of the output signal of the amplifier 16 to a maximum of 0.4 volts, peak to peak.

Output from the amplifier I1B is inputted to the tracking band pass filter 13, same being a two element device, the individual elements of which generally are indicated by the numerals 22 and 23.

An amplifier I4A and an amplifier I4B are the amplifiers for the two, two-pole cascaded tracking band pass filters 22 and 23. A decimal decoder driver I2 and a decimal decoder I3 are used to select one of seven resistors of a bank 402 and a bank 403 of the respective filters 22 and 23 and to switch selected ones of those resistors to ground. Each of the seven pairs of resistors in the banks 402 and 403 centers the frequency of the combined band pass filter 13 to one of seven frequencies. Each individual frequency, as will be recognized by those skilled in the art, corresponds to a particular speed. The resistor banks 402 and 403 are switched by a BCD code inputted to the channels 7 and 11 at connection lines 404, 405 and 406. The BCD code used to switch the seven resistors represents the "tens" digit in the patrol car speed as registered in a delayed counter generally indicated by the numeral 26 in FIG. 4 and described in detail hereinafter. The limits of the filtering provided by the filters comprising the channel 11 means that the radar unit 1 is able to track the speed of the radar platform or patrol car in a range between 10 miles per hour and 80 miles per hour. The radar platform speed is set initially as described hereinafter.

An amplifier I1A (FIG. 3) is the first active element of channel 7 for the fixed filter 8 having a cut out frequency of 1.3 KHz corresponding approximately to 40 miles per hour. The filter 8 eliminates all doppler signals for which the combined speed of the radar platform and the speed of an approaching target vehicle is less than 40 miles per hour. Amplifiers I6A and I6B are the active elements of a selectable, five pole chebyshev high pass filter 9. The lower cut off frequency of the filter 9 is switched by the same BCD signal from the counter 26 that switches the tracking band pass filter 13 except that the filter 9 is switched in multiples of 20 miles per hour. The cut off frequency of the filter 9 is approximately twice the upper band pass filter 13 limit so that only approaching target vehicle speeds near to or exceeding the radar platform's speed will be readily recognized. Approaching vehicles at speeds much below the patrol car's speed will only be detected when they are very close to the radar unit 1 as their doppler signal is greatly attenuated by the filters in the channel 7.

A dual BCD MOS-FET switch I7 is utilized to switch various resistors in the filter 9 to raise the cut off frequency of the filter. A plurality of diodes CR4 through CR9 switch respective ones of a plurality of resistors R43, R44, R53, R54, R61 and R62 to AC ground in parallel with resistors R41, R52 and R59 in response to the same BCD code provided by the counter 26 along conductors 420 and 440 so that the Chebyshev response is preserved for all cut off frequencies provided in the filter 9.

The high doppler pulse of channel 7 thereafter is fed to a high doppler limiter 10. This limiter (10) includes an amplifier I5 which is a zero voltage crossing detector utilized to form the doppler signals into a square wave. The squaring process eliminates much of the amplitude variation of the doppler signals and provides an exact time reference point for measuring the frequency of the signals.

The high doppler signal forms the input along a connection line 501 for high frequency doppler pulse shaping network 500 (see FIGS. 1 and 4) which includes a Schmitt trigger 49. Schmitt trigger 49 utilizes transistors Q202 and Q203 as the active elements and further acts to shape the high frequency doppler pulses. Output of Schmitt trigger 49 is inputted to a one-shot I202B which generates a 0.6 microsecond pulse from the positive edge of the pulse input from the Schmitt trigger 49. The output of I202B is fed to a first high frequency doppler pulse selector 520 and to an OR gate I205D where it enters a speed counter 525.

The low frequency doppler pulse of channel 11 is fed to a low doppler limiter 14 from I4B via conductor 410. Limiter 14 includes an amplifier I229 which functions as a zero voltage crossing detector and forms the doppler signal from the filter 13 into a square wave. As in the case of the amplifier 15, this squaring process eliminates much of the amplitude variation inherent in doppler signals and provides an exact time reference point for measuring frequency of the signal.

Transistors Q200 and Q201 are the active elements of a Schmitt trigger 56 and form a low frequency doppler pulse shaping network 515 which further shapes the low frequency doppler pulses of the channel 11. A one-shot I202A performs the same function in the channel 11 as the one-shot I202B performs in the channel 7.

The resultant output of the channels 7 and 11 then are narrow 0.6 microsecond pulses occurring at the positive zero transition of the doppler signal and therefore, each pulse represents one cycle of a doppler signal. The output of I202A is fed to a patrol car speed counter 530.

It may be observed (FIG. 1) that operation of a switch assembly 15 placing the radar unit 1 in the stationary mode of operation, bypasses the filter means 6 so that the output of the preamplifier 5 is fed directly to the low doppler limiter 14, and in particular, to the amplifier I229 (FIG. 4) of the limiter 14. In the latter case the unit 1 will directly measure the speed of oncoming vehicles when the police car is stationary, and the operation of the patrol car speed counter (described later) as well as other components, is obviated. The output of the Schmitt trigger 56 and its associated one-shot I202A is directed to a high frequency doppler adding circuit means 60 (FIG. 1) for processing as described hereinafter.

The conversion of a doppler frequency to speed operates on the principle that the frequency of the doppler signal corresponds to the formula $f_d=(2V/C)(f_o)$ where $f_d$ equals the received doppler frequency in Hz, $V$ equals the velocity of the reflecting body in miles per hour, $C$ equals the speed of propagation of RF energy in miles per hour and $f_o$ equals the transmitted frequency in Hz. The outputs of the one-shots I200A and I200B then have a pulse repetition derived from the same formula. Multiplying these signals by a properly chosen time signal will give a number of pulses, thereby effecting time correlation. Consequently, a number of pulses that occur in a specified time period will numerically equal the relative speed of the object producing doppler signal.

The first low frequency doppler pulse that arrives, after each circuit recycling, is selected by a selector 36 (FIGS. 1 and 4) and inputted to a primary time base generator 59 through a connector 36a. The first low frequency doppler pulse starts the primary time base generator 59. A 31.858 microsecond pulse is generated by the primary time base 59 which is inputted to the low frequency doppler pulse shaping network 515 via a conductor 515a.

The first low frequency doppler pulse also is inputed via the conductor 36a, to a secondary time base counter 63, which begins counting on the arrival of the first low frequency doppler pulse. Secondary time base counter 63 counts the time interval between the arrival of the first low frequency doppler pulse and the arrival of the first high frequency doppler pulse. The first high frequency doppler pulse is obtained from the output of the high frequency pulse shaping network 500 by a selector 520 via a conductor 520a. The secondary time base 59 stores this count until the end of the primary time base gate. It then counts off the same length of time before closing the gate to the high frequency doppler adding circuit means 60 (described later). This effectively shifts the gate to a high frequency doppler pulse counter 525 so that it begins counting with the arrival of the first high frequency doppler pulse to arrive after the first low frequency doppler pulse has passed. The counting scheme thus provided has the characteristic that no "rounding-off" of speeds is performed.

One of the primary elements for the radar unit 1 is a crystal oscillator 61 (FIG. 1) which produces a 1.0280 MHz signal output. The output from the crystal oscillator 61 forms an input for the primary time base 59 which will include a ripple counter 62 (FIG. 5) formed by I109A, I110, I111, I112 and I113. This counter (62) divides the 1.0280 MHz signal from the oscillator 61 to form a 31.875 Msec gate pulse at a line 515a (FIG. 1). The gate pulse, as indicated above, is used to gate the outputs of the one-shots I202A and I202B (FIG. 4) into counters. The ripple counter 62 (FIG. 5) is reset by the first low frequency doppler pulse delivered via conductor 36a. When data is stored into the counter 62, either a count of zero or thirty six is preset into the counter 62 by an interval selector 1109B which acts as a one-shot counter that changes state after every second missed count. Other pulses are taken from the primary time base 59 (FIG. 1) for gating, calibration and tone generation.

Secondary time base counter 63 (FIGS. 1 and 5) is a cascaded 8 bit up/down counter comprising I106 and I107 which counts 7.78 microsecond wide pulses, starting at the trailing edge of the first low frequency doppler pulse to arrive after the primary time base gate at 1108A opens, and stops counting with the arrival of the first high frequency doppler pulse via conductor 520a or a count of 256 (3.98 microseconds), whichever comes first. It stores this count until the primary gate I101B closes and then counts down the same number of 7.78 microseconds wide pulses to a count of zero, which generates a borrow pulse at I107 and opens the gates to control pulses C1 and C2 via I101B and a connecting line 610a. Control pulse C1 marks the end of the count in the high frequency doppler pulse counter 525 (FIG. 1). Consequently, the gate to the high frequency doppler pulse counter 525 has been independently shifted so that it begins counting with the arrival of the first high frequency doppler pulse after the first low frequency doppler pulse has passed.

The control pulses C1 and C2 are generated in a pulse generation circuit 610 (FIG. 1) having an input connection line 615 from primary time base 59.

C1 and C2 are 0.97 microsecond pulses generated from the primary time base 59 at I121E and I121B respectively, if no speed violation is detected at I125A. A $\overline{C1}$ pulse will appear at the output of I120A. 4.86 microseconds after the secondary time base counter 63 has counted down to zero if the stored speed of the patrol car in the delayed counter 26 (FIG. 1) does not match the speed just counted by the low frequency doppler pulse counter 530. A $\overline{C1}$ pulse will appear at the output of I120B (FIG. 5) if the stored speed of the approaching vehicles inputted to I120B along connection line 586 does not match the count of the speed counter 525 at that instant. If this pulse occurs, then the count in the speed counter 525 is transferred to a speed storage register 535 and the $\overline{C1}$ pulse marks the end of the high frequency doppler pulse gate.

A $\overline{C2}$ pulse occurs on the output side of I123B (FIG. 5) some 6.81 microseconds after the secondary time base counter 63 has counted to zero. The trailing edge of the pulse, via line 612, triggers a 1.8 microsecond one-shot I227A (FIG. 4) which in turn generates a delayed C2 pulse, herein referred to as C2 pulse on line 613, same being used for resetting the primary gate and updating the counters. The delayed C2 pulse is, therefore a restarting pulse for the counting cycle.

I201A, I204C and I203B (FIG. 4) form the low frequency doppler pulse selector 36. I201A is a J-K flip-flop which forms a gate that opens with the arrival of each C2 pulse generated from I227A (the C2 one-shot) and closes with the trailing edge of the first low frequency doppler pulse to arrive after a C2 pulse has finished, inputted from I202A along a conductor 540. I201A allows the first low frequency doppler pulse, and no other, to appear inverted at the output of I204C. The first low frequency doppler pulse simultaneously is inputted along a conductor 545 and resets the patrol car speed counter 530 to zero. As indicated above, is also resets and starts both the primary time base 59 and secondary time base counter 63. The gate function of I201A also serves to preset the patrol car speed from the delayed counter 26 via a conductor 550 and I203B, into the speed counter 525 (FIGS. 1 and 4) so that the speed counter 525 will be able to perform its subtraction operation, described in more detail later.

I200A (FIG. 4) and I108A, I104D and I102F (FIG. 5) form first high frequency doppler pulse selector 520. I108A is a J-K flip-flop, set by the leading edge of the first low frequency doppler pulse inputted at I108A by the common connection of the conductors 36a and 550 shown in FIG. 1. I108A opens the gate to the up count of the secondary time base counter 63 at I100B and simultaneously opens the gate formed by I200A via conductor 425. I200A allows a high frequency doppler pulse from I202B to pass after the first low frequency doppler pulse from the low frequency doppler selector 515, via conductor 521, is finished. The high frequency doppler pulse from I202B appears inverted at the output of I200A and by way of conductor 520a, I104D and I102F, resets the I108A flip-flop, thereby closing the gate to the up count of the secondary time base counter 63, and closing the gate I200A so that no more high frequency doppler pulses may pass. The inverted first high frequency doppler pulse appearing at the output of I200A will be very narrow since the gate will shut off as soon as I108A is reset.

The patrol car speed counter 530 (FIGS. 1 and 4) is formed by integrated circuits I206 and I207, which are cascaded, binary coded decimal counters that count the inverted and gated low frequency doppler pulses inputted from I202A along a conductor 555 in the moving mode sent by switch assembly 15. I206 counts the units and I207 counts the tens of the patrol car speed at the end of the primary time base gate input to the pulse shaping network 515. The counter is preset to zero by the first low frequency doppler pulse inputted to I207 and I206 via conductor 545 so that the counter begins counting with the second low frequency doppler pulse. In the stationary mode of operation, the counter is continually set to zero by the position of the switch assembly 15.

The output for the counter 530 forms an input for a patrol car's speed comparator 560. I208 and I209, which form comparator 560, are cascaded comparators that compare the count registered in the partrol car's speed counter 530 to the count stored in the patrol car's speed delayed counter 26. If the count in counter 530 exceeds the count in counter 26, then the count up gate I204A will be open. If the count in counter 530 is less than the count in counter 26, then the count down gate I204B will be opened. If the counts in the counter 530 and 26 are identical, the output along a conductor 570 will reset a delayed counter count pulse generator 565 (FIGS. 1 and 5) and a C1 pulse will be inhibited from appearing on the output of I120A. Although the comparator 560 works continuously, only comparisons at the end of the counting cycle are used since its output are only used to gate C1 and C2 pulse generator 610 (FIG. 1). If the count in the delayed counter 26 does not equal the count in the patrol car's speed counter 530, no speed will be displayed for an approaching vehicle.

Delayed counter 26 allows the band pass filter 13 to search systematically for the patrol car's speed even when the speed is not in the pass band of the filter. In addition, once the speed is found, the delay counter 26 holds the count even during brief intervals of random large doppler signals near the frequency representing the speed of the patrol car sometimes encountered for example when the patrol car is approaching a slow moving truck or is being passed by fast moving vehicles.

Figure 4:
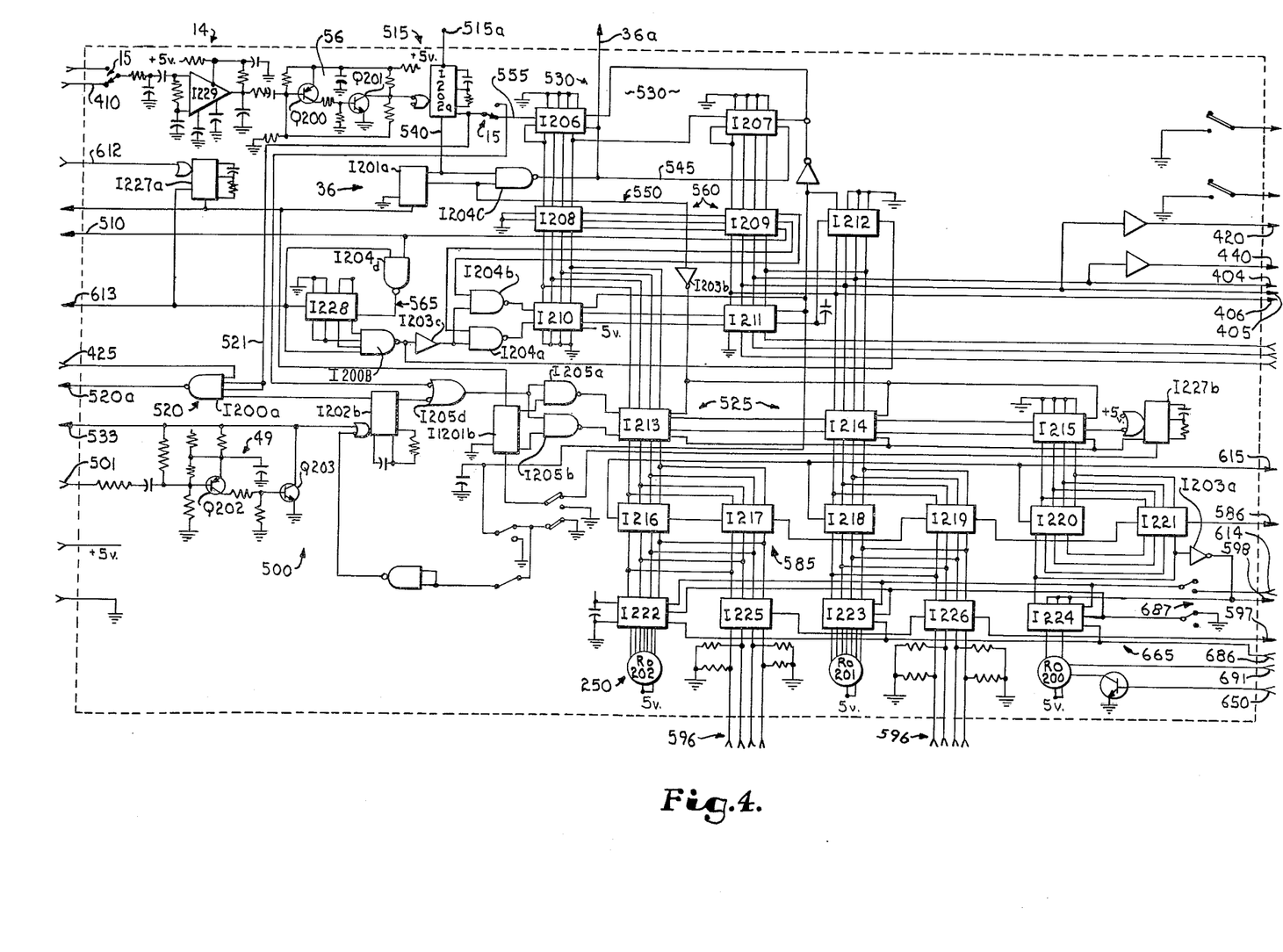
FIG. 4 is a detailed schematic diagram for a first circuit portion for the radar unit of FIG. 1.

The delayed counter 26 includes I204A, I204B, I210 and I211 (FIG. 4). Basically, counter 26 is a cascaded, two decade, BCD up/down counter which counts the units I201 and tens (I211) of the patrol car'speed. Gates I204A and I204B gate count pulses from the delayed count pulse generator 565 into the count up (I204A) or the count down (I204B) input of the counter I210. When the delayed counter 26 begins counting, a count limit detector I212 presents a speed equal to the closest multiple of 20 miles per hour that is less than a violation speed limit preset into the tens counter I211. Counter 26 then counts pulses up or down, depending on the output of the comparator 560 until the count equals the count in the patrol car's speed counter 530. Counter 26 usually will begin counting down because the doppler signal is not in the pass-band of the band-pass filter 13 and a count of zero miles per hour is registered until the pass band of filter 13 is switched near to the doppler frequency by the delayed counter 26. In the stationary mode of operation, the delayed counter is continuously reset to zero by the switch assembly 15.

The count limit detector I212 compares the tens digit of the delayed counter 26 (I211) to zero. When the delayed counter 26 counts below 10 miles per hour, the next count pulse will reset the tens counter I211 to the preset count described above.

Delayed counter count pulse generator 565, formed by integrated circuits I228, I200B, I204D and I203C, generates the pulses for the delayed counter 26. I228 is a binary 4 bit counter and, together with I200B, counts every eight C2 pulses generated from I227A if the comparator 560 does not register an "equal" comparison at I204D from 209, and directs this eight C2 count pulse to the count up gate I204A, count down gate I204B, and the count limit detector I212. Once the delayed counter 26 has found the speed of the patrol car by counting process described above, I204D presets a count of twelve into the generator 565 every time a C2 pulse is generated, and no additional count pulse will be generated. Once the delayed counter 26 has found the speed of the patrol car, it will be able to correct a 1 mile per hour change within 0.127 seconds. In other words, the counter 26 can track the speed of the patrol car if that speed does not change faster than 7 miles per hour per second. The most difficult situation for finding the patrol car's speed initially is when the violation speed limit is 80 miles per hour or above and the patrol car is moving at 10 miles per hour. Under this condition, 17.84 seconds are needed to find the patrol car's speed.

A patrol car speed up date counter 625 and a missed count counter 630 (FIG. 5) are utilized in the unit 1 to control the suitable display of patrol car speed. It has been found that if three to five consecutive equivalent counts are made in the patrol car's speed, then the count is a reliable representation of that speed. On the other hand, the large hysteresies in the delayed counter 26 means that once the speed has been found, many miscomparisons can be tolerated before the unit 1 actually has lost the speed of the patrol car. In the radar unit 1, 42 consecutive missed comparisons indicate that the patrol car's speed is lost.

Another important consideration is the operation of circuits I206 and I207 (the counters which record the speed of the patrol car e.g. counter 530) in conjunction with the delayed counter 26 (I204A, I204B, I210 and I211). If the counted output from the combined circuits I206 and I207 is greater than the count in the combined circuits I210 and I211, the outputs from the comparator circuit I209 gives a "count up" instruction. Conversely, if the count in I206 and I207 is less than the count in I210 and I211, the outputs from the comparator circuit I209 give a "count down" instruction. In this manner, if the patrol car is following a large truck, the radar effect which normally would require the unit to read the closing state (e.g. the difference between the truck's speed and the patrol car's speed) is obviated. The comparators I208 and I209 actually blank the readout momentarily so no false readings are given unless the patrol car is traveling at the same rate of speed as the truck. This feature may be thought of as a fly-wheel effect. Since the unit ignores the false reading and since the patrol car usually passes the slower truck in a matter of seconds, the speed recognized by the unit remains accurate.

Figure 5:
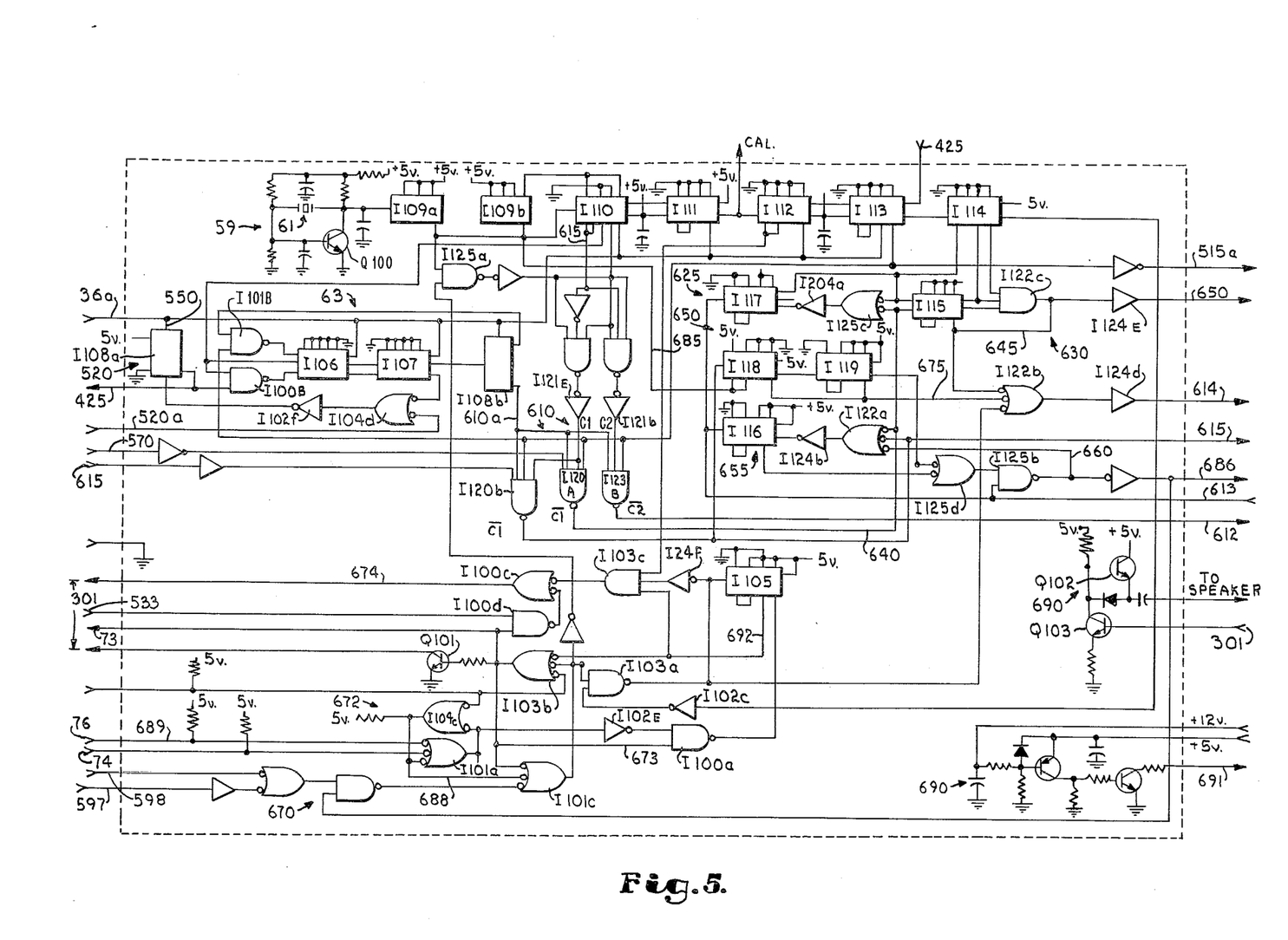
FIG. 5 is a detailed schematic diagram for a second circuit portion for the radar unit of FIG. 1.

Patrol car speed up date counter 625 includes I117, I204A and I125C (FIG. 5). I117 is a 4 bit, binary counter which counts C2 pulses inputted along conductor 613 from I227A. The counter I117 is preset to a count of 12 and counts to a count of 16 from I125C or it is reset to a count of 12 when a $\overline{C1}$ pulse appears on the output of I120A, indicating that the patrol car's speed in counter 530 does not match the count in delayed counter 26. When the counter I117 is allowed to reach a count of sixteen, it will reset patrol car speed missed count counter 630, which will remove one of the three possible display blanking pulses. After a missed comparison, i.e. a $\overline{C1}$ pulse, the counter I117 is preset to 12. Three microseconds later a C2 pulse should appear, making the count 13. Three more consecutive C2 pulses, or equal speed comparisons, brings the count to 16 and removes the blanking pulse.

Patrol car speed missed count counter 630 includes I115 and portions of I114 and I122C. As best observed in FIG. 5, I115 and half of I114 form a cascade, 6 bit, binary counter which counts $\overline{C1}$ pulses from I120A, inputted to I115 along conductor 640. When the up date counter 625 reaches a count of 16, indicating three consecutive equal comparisons, the missed count counter 630 is reset to zero. Gate I122C is set to give a low output if a count of 42 or above is reached by the counter I115–I114. Forty-two missed counts will register a pulse on the output of I122C. This output pulse will strobe a count of 47 to the counter I115 via conductor 645 which holds or latches the pulse until the count is reset to zero by the update counter 625. This missed count pulse at I122C is one of three pulses that can blank the display, indicated generally by the reference numeral 250 (in FIG. 1) through I122B and I124D and conductor 614. The same pulse also is inverted by amplifier I124E and is used for presenting a negative sign or horizontal bar on the display via conductor 650. The horizontal bar alerts the operator that 42 missed counts have been observed by the unit 1 while searching for the patrol car's speed and that the unit 1 does not know the patrol car's speed.

In the stationary mode of operation, no $\overline{C1}$ pulses are generated so the update counter 625 counts continuously resetting the missed counter 630, thereby preventing the display from blanking.

The approaching vehicle's speed counter and patrol car speed subtraction 525 (FIG. 4) basically is a three decade BCD up/down counter constructed with integrated circuits I213 for unit count, I214 for ten count and I215 for hundred count. The gate used for selecting the first low frequency doppler pulse at I201A, which begins with C2 and ends with the end of the first low frequency doppler pulse, is fed, via an amplifier I203B and used to preset I213, I214 and I215 with the count from the delayed counter 26 into the units and ten counter of the speed counter 55. A zero is loaded into the hundreds digit because the patrol car's speed cannot be counted above 80 miles per hour. Consequently, after the first low frequency doppler pulse is completed, the patrol car speed is stored in the counter 525 and the counter 525 is ready to count.

I201B is a J-K flip-flop used to gate the high frequency doppler pulses from I205D to the count up I205B or the count down I205A input to the counter 525. Initially, a C2 pulse from I227A sets the flip-flop I201B high, opening the count down gate I205A. The count down operation subtracts one count in the unit counter I213 for each high frequency doppler pulse received from I205D. When the units counter I213 reaches zero, the next pulse generates a borrow pulse that subtracts one ten unit from the ten counter I214 and registers a nine count in the unit counter I213.

The speed counter 525 continues to count down until a count of 000 is reached. At this point, the speed of the patrol car has been subtracted out of the speed counter 525 and the remaining number of high frequency doppler pulses that occur in the gated time interval will equal the speed of the approaching vehicle. Therefore, the remaining doppler pulses must be counted up or added in the speed counter. This is accomplished by resetting the I201B flip-flop, opening the count up gate I205B to the counter 525. A one-shot I227B is triggered when the counter I215 attempts to borrow when the count reaches 000. The pulse from the one-shot I227B resets the flip-flop I201B. All remaining high frequency doppler pulses will then count up in a counter and the count at the end of the timing gate C1 will be the speed of the approaching vehicle.

In the stationary mode of operation, only zeros are loaded into the counter 525 because the count in the delayed counter 26 is zero. Flip-flop I201B is held in the reset position by the switch assembly 15 so that the count up gate I205B is held open. No high frequency doppler pulses are channeled to the counter 525 through the switch assembly 15 via a conductor 575 and the gate I205D. Since the low frequency doppler pulses are gated by the primary time base, the count in the counter 525 at the end of the cycle will equal the speed of the approaching or retreating vehicle.

The speed storage register 535 receives the speed count from the counter 525. A C1 pulse on the output side of I120B indicates that the present speed count in counter 525 does equal the previous speed count in the counter 525. The development of this $\overline{C1}$ pulse is described hereinafter. It is here sufficient to note that this $\overline{C1}$ pulse (via conductor 615) is used to strobe data from the speed counter 525 to the speed storage register 535 which includes I216, I218 and I220. I216 stores the unit count; I218 stores the ten count; and I220 stores the hundred count. The count in counter 525, when pulse $\overline{C1}$ appears at the output of I120B, will be the exact speed of the target vehicle since C1 pulses always occur at the end of the secondary time base. If a $\overline{C1}$ pulse is not generated at I120B, the present speed count in counter 525 equals the previous speed and there is no need to reload the speed storage register 535.

An approaching vehicle speed comparator 585 is a cascaded, 4 bit data comparator that includes integrated circuits I217, I219 and I221. I217, I219 and I221 respectively simultaneously compare the units, tens and hundreds count in the speed storage register 535 to the count in speed counter 525. When these counts are equal, a positive pulse appears at a conductor 586. If this pulse occurs simultaneously with C1, then the speed just counted is identical to the speed previously counted and $\overline{C1}$ is not produced at I201B. If the pulse at I221 does not occur simultaneously with C1, then a $\overline{C1}$ pulse strobes the data input into the speed storage register 535, and is counted in a missed counter 650 (FIG. 5).

A speed update counter 655 (FIG. 5) includes integrated circuits I122A, I124B, and I116. The purpose of the update counter 655 is to ensure that five consecutive speed counts, both of the patrol car and of the approaching vehicle, are identical before the unit 1 displays the count as being the speed of the approaching vehicle. This eliminates the presentation of non-reliable counts. Update counter 655 basically is a four-bit, binary counter I116 which counts C2 pulses from conductor 613 and is reset to a count of 12 by: (1) a $\overline{C1}$ pulse from I120A, which indicates that patrol car's speed counts in comparator 560 (FIG. 4) do not match [inputted at I224A]; (2) a $\overline{C1}$ pulse from I120B which indicates the speed counts in comparator 585 do not match [at I112A]; or (3) the first C2 pulse to arrive after the counter I116 has counted to 16, indicating four identical consecutive comparisons have been made [inputted at I122A];

I125D and I125B (FIG. 5) provide a latch which is used to single out the first C2 pulse to arrive after the update counter 655 has counted from twelve to sixteen, or the fifth consecutive C2 pulse to appear without the appearance of $\overline{C1}$ pulse. The latched pulse indicates that five identical speed counts have been made so that the count is reliable. In addition to resetting the update counter 655 via a conductor 660, the pulse is used to reset the approaching vehicle missed counter 650; strobe data into a display driver and latch circuit 655 via conductor 686 and enable a violation signaling circuit 670.

The approaching vehicle missed counter 650 includes an eight bit binary counter I118 and I119 which counts C1 pulses from I120B indicating a missed comparison in the approaching vehicle speed. The counter is preset to a count 209 by the fifth C2 pulse output from the update counter 655. Missed counter 650 counts to a count of 256 at which time I119 goes low, thereby strobing and holding a count of one on I118. The strobing pulse is also used to blank display 250, via a conductor 675 I122B and I124D, until the missed counter 650 is reset by the update counter 655 along a conductor 680. If a fifth C2 arrives from the update counter 655 before the missed counter 650 counts to 256, then the miscounter 650 is reset and the display changes the speed of the new approaching vehicle without blanking. The first bit in the missed counter 650 is used to toggle the J-K flip-flop I109B via conductor 685 which changes the length of the gate from the primary time base 59 (FIGS. 1 and 5). This change eliminates the possibility that $\overline{C1}$ pulses or missed counts develop because of the fact that the last doppler pulse falls intermittently inside and outside of the time base gate from primary time base 59. Thus, at doppler signal frequencies of transition from one numeral to the next, the uncertainty, which normally causes counts to alternate, is obviated. This time interval alteration is so small that its effect on accuracy is negligible.

The LED display 250 (see FIG. 4) for the radar unit 1 includes two seven segment light emitting diode displays, $R_o202$ for the units and $R_o201$ for the tens read-out, and a one segment display $R_o200$ for the hundreds read-out. The LED display 250 is driven by the display driver and latch network 665 comprising composite integrated circuits I222, I223 and I224 which are each composed of a four bit latch memory, and a BCD decoder-driver having 47 ohm limiting resistors in the open collector outputs. The fifth C2 pulse via a conductor 686 from update counter 655 (in FIG. 5) strobes data to I222, I223 and I224 from speed storage register 535. Then if the blanking gate from I122D and I124D via conductor 614 is high, the data is displayed. A number of operations may be displayed and operated from a control panel in the radar unit 1, not shown. For example, a switching arrangement 687 may be provided so that the segments of the LED display 250 may be checked for proper operation. $R_o200$ operates the horizontal bar, which as described above, is actuated by the patrol car speed miscounter 630 via a conductor 650 to indicate that the operator speed has not been calculated. $R_o200$ also operates a vertical bar which is displayed to indicate that the supply voltage is below 11 volts, or that the operator's automobile battery has too low a charge to operate the radar unit 1. This condition is determined by a low voltage detector 690 whose signal along a conductor 691 actuates $R_o200$.

A violation comparator 590 is provided which received an input from the speed storage register 535. A second input to the comparator by a violation speed preset switch 595 (shown in block form in FIG. 1) is inputed to I225 and I226 at input terminals generally indicated by the numeral 596. The violation speed limit is programmed into the switch 595 by the operator. This signal is compared to the count in the approaching vehicle speed storage register 535 by the comparators I225 units and I226 tens. The comparators I225 and I226 generate a high output on a conductor 597 if the stored speed exceeds or equals the programmed speed limit. This pulse triggers the signal violation network 670 if five consecutive identical counts are registered by the speed update counter 655.

If the stored speed exceeds one hundred miles per hour, I203A also will trigger the signal violation network 670 via a conductor 598. Signal violation network 670 includes a violation latch 671, a lock and automatic latch 672, a beep counter 673 and an audio circuit 674.

The violation latch 670 (FIGS. 1 and 5) is controlled in part by the operation of a switch assembly 73. Violation latch 670 detects whether an output has been generated from the speed count comparator 585, whether the count, as determined from the update counter 655, is good, and then it blocks the generation of the timing pulses at I125A of the pulse generator 610. This prevents any further doppler pulse counting. The network 670 then generates a series of six, 1 KHz beeps at 0.255 second intervals and simultaneously flashes the display 250. In the manual mode of operation, the unit 1 will then recycle, looking again for five consecutive readings unless a lock button 74 of switch 73 is pressed. If the lock button 74 is pressed, the display 250 will continue flashing and the beeping will cycle on and off. The display 250 will be locked on until a release button 76 is pressed, which allows the circuit to recycle. In the automatic mode, the lock button 73 is automatically pressed and the violation speed will remain displayed until the release button 76 is pressed.

The violation latch 670 includes integrated circuits I101C and I103B which will latch if the computed speed equals or exceeds 100 miles per hour, inputted from I203A, and the update counter 655 indicates that the count is good. It also will latch if a lock and auto latch 672 is latched because of a connection line 688 between I101A and I101C. The violation latch 670 will release if the release button 76 is pressed which grounds a conductor 680; or a beep counter 673 reaches a count of 16 from 10 and the lock and auto latch 672 is released. The violation latch 670 functions to disable the generation of C1 and C2 pulses in the pulse generator 610 thereby eliminating the further computing of doppler pulses and updating; and allowing 0.1275 second pulses from the primary time base 59, and in particular I114 thereof, to blank the display driver and latch 665, thereby flashing the display 250 four times per second. It also disables an audio attenuation potentiometer (not shown) by turning off a transistor Q101 and at the same time decoupling high frequency doppler signal from I200D, thereby allowing the beeping signal to be heard at full volume from its output of I100C.

Lock automatic latch 672 includes I101A and I104C. Lock and automatic latch 672 is set if the lock button 74 is pressed or if the automatic mode is closed at switch assembly 73 by the operator. It is released only by pressing the release button 76. The lock and automatic latch 672 serves the function of holding the violation latch 670 "on" and inhibiting the data strobe on the beep counter 673 thereby forcing it to continue counting in cycles of 16 counts Pressing the lock button 74 will hold the number in the display 250 as it flashes and the beeping is heard, whether the speed represents a violation or not. In the automatic position of switch 73, the display 250 is held automatically when a speed violation is detected by the unit 1. The release button 76 will release the display in either mode of operation.

Beep counter 673 includes I105, I103A, I102C, I102E and I100A. Beep counter 673 accepts 0.1275 second pulses at I103A through I102C from the primary time base at I114 if the violation latch 671 is set. These timing pulses are used to blank the display 250 four times per second through I122B, I124D and a conductor 614. These timing pulses also gate the 1 KHz tone to an audio control 674 through I24F and I103C which provides four beeps per second. The timing pulses are counted by the four bit binary counter I105 which has been preset to a count of 10 when the violation latch 670 and the lock and autolatch 672 are both reset. Consequently, when the violation latch 670 is set, the counter I105 counts from ten to a count of 16, at which time I105 goes low and resets the violation latch 670 via a conductor 692 and I103B. If the lock and automatic latch 672 is not set, the counter I105 is reset to a count of 10 after six beeps and the violation latch 671 remains reset allowing the counter I105 to accept new counts. If the lock and automatic latch 672 is set, the counter I105 is not reset and the violation latch 670 is inhibited from resetting. At this time, the counter I105 continues to count with the display flashing but the 1KHz beeping signal provided through audio control 674 is inhibited until a count of eight is reached. Thereafter, eight beeps will be heard until a count of 16 is reached by the counter I105. This portion of the unit 1 will continue recycling until the reset button 76 is pressed.

The audio circuit includes audio control 674 and an audio amplifier 690. Under normal operation, the high frequency doppler signal from the Schmitt trigger 49 is fed, via conductor 533, to the auio amplifier 690, which includes a transistor Q102 and a transistor Q103 by way of integrated circuits I100D, I100C and an audio potentiometer resistor (not shown) indicated generally by the numeral 301 in FIG. 5. The doppler signal may be attenuated to any level by the audio potentiometer resistor which may be controlled from the front panel of the unit 1. When the violation latch 671 is set, the audio part is disabled by the opening of the transistor Q101 and the high frequency doppler signal is decoupled at I100D. The signal from the counter I105 via conductor 692 and the 0.1255 second pulse from I114 gate a 1 KHz signal from I112 of the primary time base 59 to the audio amplifier 690 through I100C. This provides the 1KHz beep when a violation has occurred or the lock button 74 is pressed.

As those skilled in the art will note, extensive use has been made of integrated circuit in the unit 1. Several complex functioning devices are used for comparing, counting, storage and decoding functions with the internal configuration of and operation parameters made in accordance with conventional manufactured data sheets. For example, two counters manufactured by the Signetic Corporation and identified by their numbers 82801 and 82811 are extensively used. These two devices operate in a similar manner with the decimal counter have a binary coded decimal output while the binary counter has a hexadecimal output. In both of the above mentioned devices, a negative transition at the input terminal advances the count by one step. Other data inputs, generally consisting of four other input terminals, allows presetting to a desired count by application of a negative going strobe pulse to a strobe input terminal The strobe input may be used to reset to zero count if data inputs are grounded or held low during the strobe input. By cascading the counter and presetting by means of data inputs, any desired total count may be obtained. To save any respective count, inputs from either device allow it to be used as a storage or latch. Voltage levels preset data inputs which will be transferred to the output terminals during strobe and the same will be held when the strobe is completed. Finally, the comparators discussed above are similar to those manufactured by Signetics Corporation (identification number 8241) with each having a combination logic array which compares binary inputs. These comparators compare two four-bit binary numbers and two or more such devices may have other outputs paralleled for greater than four bits.

Other conventional uses include the conventional dual J-K binary flip-flop using a master-slave principle which may also be used as a binary toggle and as a set-reset latch as well as in the J-K mode.

From the foregoing, it will be seen that this invention is one well adapted to attain all of the ends and objects herein set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matters herein set forth or shown in the accompanying drawings is to be interpreted as illustrative and not in any limiting sense.

Having thus described the invention, we claim:

1. A doppler radar device for use in law enforcement and service vehicle speed surveillance and for determining the speed of an approaching target vehicle when the radar platform vehicle is either moving or stationary, said device comprising:
   means for producing a continuously running time base;
   a single means for receiving a composite doppler signal having components relating to the speed of said target vehicle and the speed of the radar platform vehicle;
   means for separating said doppler frequency into a first frequency component and a second frequency component;
   means for correlating the frequency of said first frequency component with said time base;
   means for correlating the frequency of said second frequency component with said time base;
   means for counting cycles of each of said time base correlated frequency components, said correlating means and said frequency component counting means cooperating to count each of said frequency components in a preselected time increment, said time increment relating to said time base;
   means for subtracting said counted cycles of said first frequency component from said counted cycles of said second frequency component; and
   means for displaying the result from said subtracting means in unit indicative of speed of said approaching vehicle.

2. The combination as in claim 1 wherein said means correlating said first and second frequency components with said time base includes gate means for initiating the counting of the cycles of said first frequency component after said first cycle of said second frequency component has passed.

3. The combination as in claim 2 wherein said initiating means includes a primary time base and a secondary time base counter, and means for initiating the counting of clock pulses corresponding to the occurrence of a preselected condition relative to said second frequency component and stopping the counting corresponding to a preselected condition relative to said first frequency component.

4. The combination as in claim 3 including means for generating control pulses, at least one of said control pulses being operable to restart the counting of said secondary time base counter.

5. The combination as in claim 1 wherein said device includes
   means for assuming a speed count of said platform vehicle,
   means for storing said assumed speed count;
   means for updating the speed count of said platform vehicle,
   means for comparing said assumed speed count to said updated speed count; and
   means for automatically changing said assumed speed count to said updated platform speed count at a rate of change not to exceed a predetermined maximum.

6. The combination as in claim 1 wherein said radar device includes a means for disabling said displaying means of said target means speed when a component of said received doppler signal could correspond to a closing rate between the platform vehicle and another vehicle rather than the platform vehicle speed relative to the surface.

7. The combination as in claim 6 wherein said disabling means includes
   means for storing an assumed speed count of said platform vehicle,
   means for updating the speed count of said platform vehicle, means for comparing said assumed speed count to the updated speed count, and
   means for automatically changing said assumed speed count to said updated platform speed count at a rate of change not to exceed a predetermined minimum, said disabling means being operable to preclude erroneous display of target vehicle speed during the operation thereof.

8. The combination as in claim 1 wherein said supporting means includes a filter network, said filter network including a high pass filter means for rejecting the platform vehicle speed frequency component.

9. The combination as in claim 1 wherein said separating means includes a filter network, said network having passing filter means for passing the platform vehicle speed frequency components and for rejecting the target vehicle speed components.

10. The combination as in claim 9 wherein said passing filter means is a band pass filter operable to reject erroneous third vehicle frequency components resulting from the closing speed of the platform vehicle and the said third vehicle.

11. The invention as in claim 10 including means for electronically controlling the passing frequency of said band pass and high pass filter means in response to an assumed speed count.

12. The invention as in claim 8 including means for electronically controlling the passing frequency of said band pass and high pass filter means in response to an assumed speed count.

13. The combination as in claim 1 wherein said separating means includes a filter network, said filter network including a high pass filter means for rejecting the platform vehicle speed frequency components and a passing filter means for passing the platform vehicle speed frequency component and rejecting the target vehicle speed components, and means for electronically controlling the passing frequency of said band pass and high pass filter means in response to an assumed speed count.

14. The combination as in claim 1 including automatic gain control means operable to preclude the exceeding of the dynamic range of said device prior to separating said doppler signal.

15. The invention as in claim 1 wherein said second frequency component corresponds to the difference in velocity between said moving platform vehicle and said approaching target vehicle and wherein said first frequency component corresponds to the velocity of said moving platform with respect to the surface.

16. A method for determining the speed of an approaching moving vehicle, said method comprising the steps of:

receiving a composite doppler signal with a single receiving means;

separating said composite dopper signal into a first frequency component and a second frequency component;

digitally producing a precise time base;

digitally correlating said first doppler signal frequency component with said time base;

digitally correlating said second doppler signal frequency component with said time base;

counting the cycles of said first correlated doppler signal frequency component;

counting the cycles of said second correlated doppler signal frequency component;

subtracting the count of said first doppler signal frequency component from said second coppler signal frequency component; and displaying the result of said subtracted count of correlated cycles.

17. The method as in claim 16 including the step of initiating the counting of the cycles of said first frequency component after said first cycle of said second component has passed.

18. The method as in claim 17 including the step of causing said displaying means to ignore said target vehicle speed when said received doppler signal could correspond to a closing rate rather than target vehicle speed.

19. The method as in claim 16 including the step of causing said displaying means to ignore said target vehicle speed when said reached doppler signal could correspond to a closing rate rather than target vehicle speed.

20. The method as in claim 19 including the steps of storing an assumed speed count of said platform vehicle, comparing said assumed speed count to an updated speed count, and correcting said assumed speed count at a rate not to exceed a predetermined maximum.

* * * * *